Feb. 9, 1960    R. DIENER    2,924,016
MACHINE TOOL

Filed July 7, 1954    5 Sheets-Sheet 1

Inventor:
RICHARD DIENER
By Fredrick E. Haug
ATTORNEY

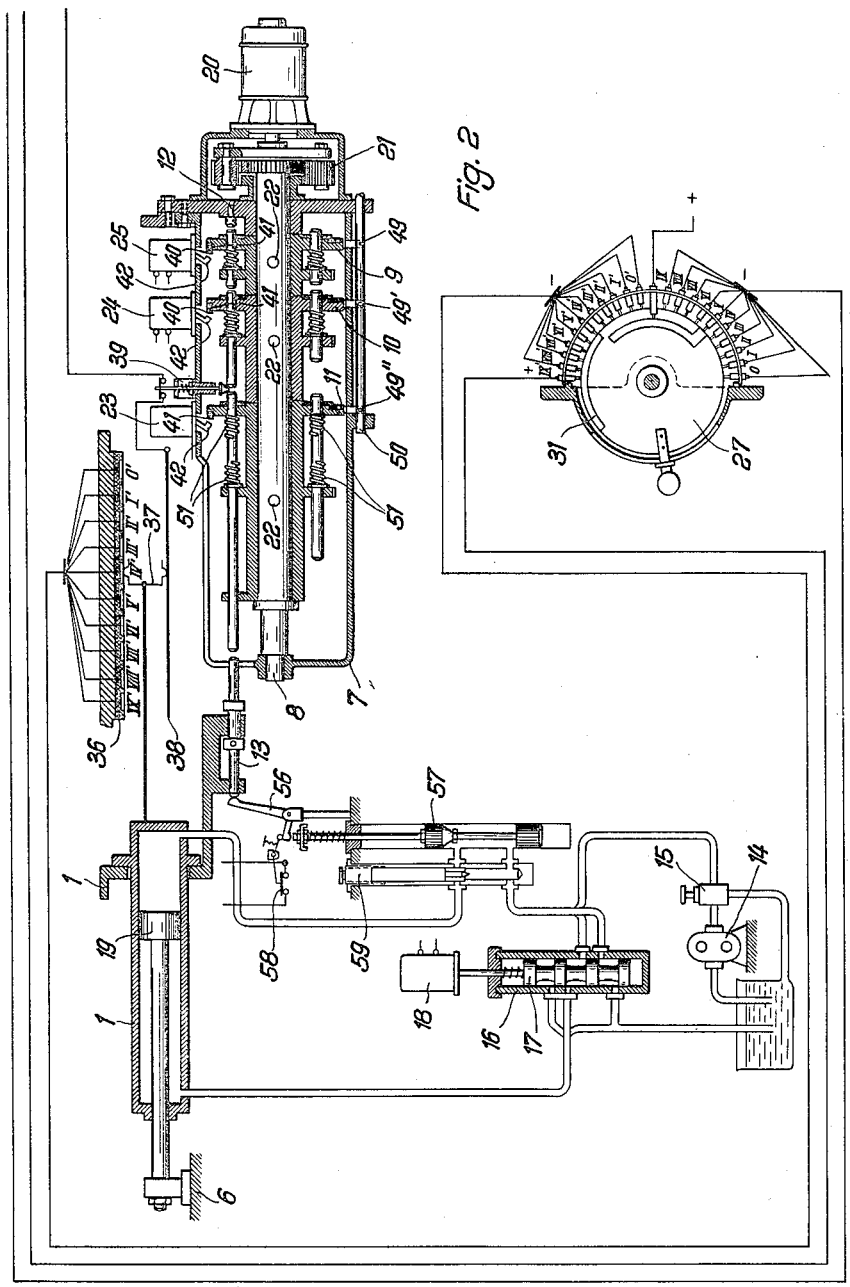

Feb. 9, 1960 R. DIENER 2,924,016
MACHINE TOOL
Filed July 7, 1954 5 Sheets-Sheet 3
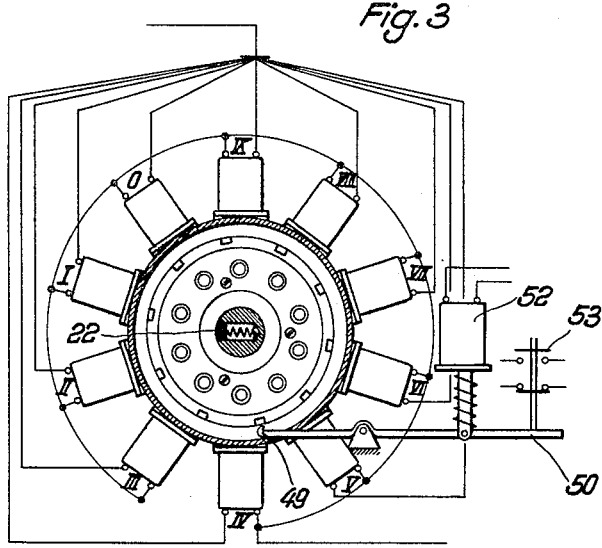
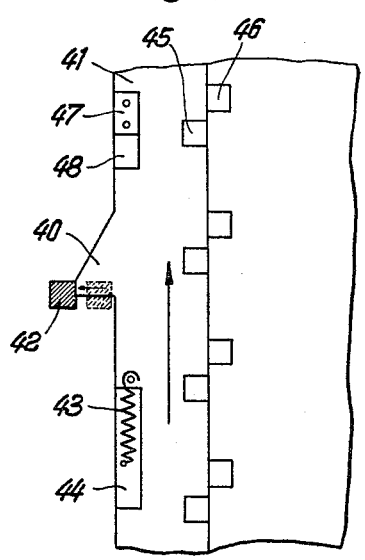
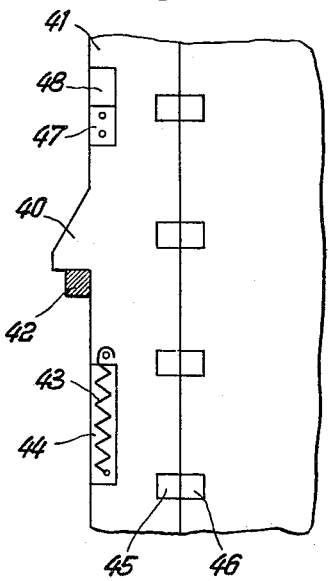
Inventor:
RICHARD DIENER
By [signature]
ATTORNEY

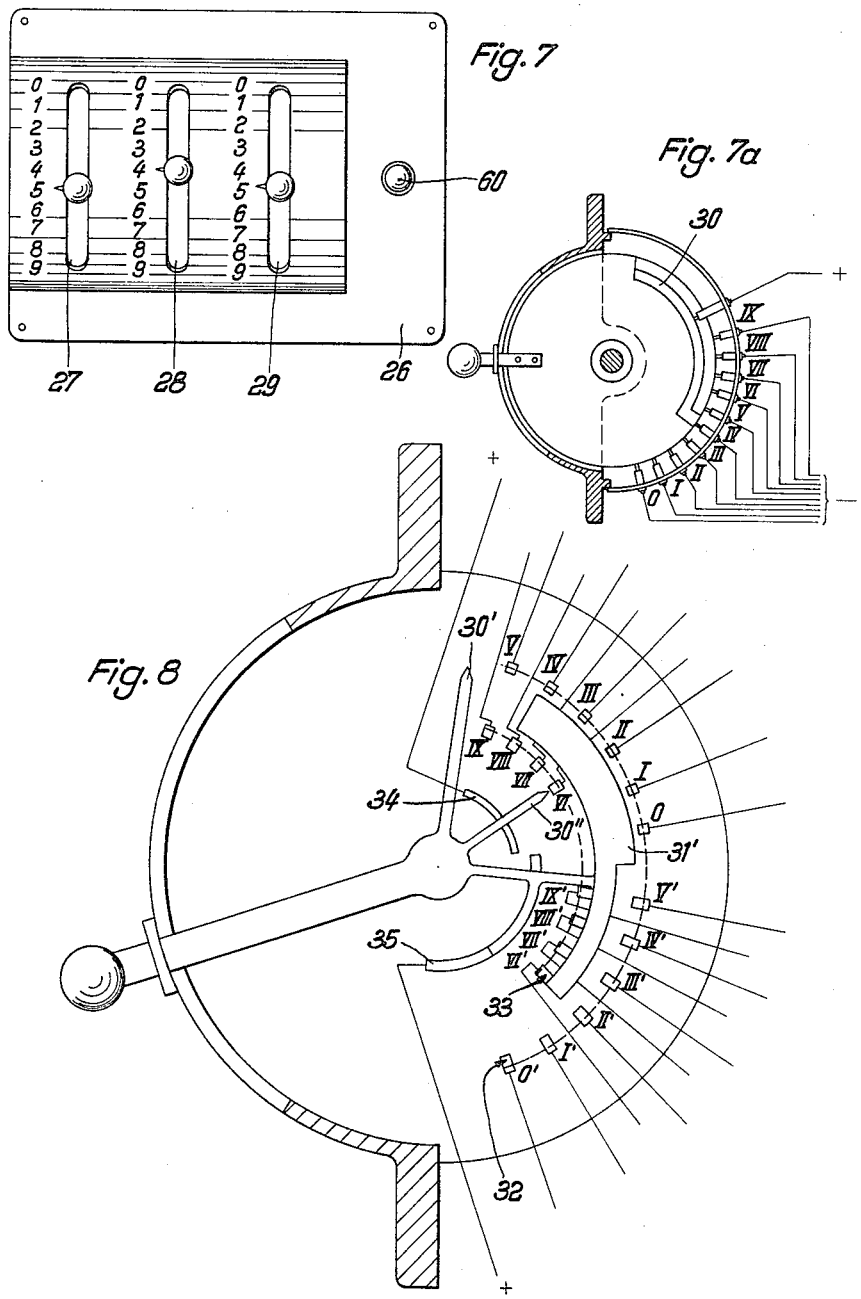

Feb. 9, 1960

R. DIENER 2,924,016

MACHINE TOOL

Filed July 7, 1954

INVENTOR.
RICHARD DIENER
BY
*Frederick E. Haug*
ATTORNEY

United States Patent Office 2,924,016
Patented Feb. 9, 1960

2,924,016

MACHINE TOOL

Richard Diener, Berlin-Hermsdorf, Germany, assignor to Berliner Maschinenbau-Actien-Gesellschaft, Berlin, Germany, a corporation of Germany Application July 7, 1954, Serial No. 442,035

Claims priority, application Germany August 28, 1953

8 Claims. (Cl. 33—125)

The present invention relates to machine tools, particularly to machine tools of the coordinate system type suitable for drilling, reaming and milling of metal.

One of the principal objects of the invention is to provide a machine tool of the general type referred to, which permits to set the machine automatically and with extreme accuracy for a pre-selected position within the working range of the machine and which further permits to accelerate the many operations that are to be performed by the machine during the normal use thereof. In other words, a machine tool according to the invention allows the operator to carry out a predetermined operation or a sequence of operations within a shorter period of time and with a higher accuracy than is possible with comparable machine tools as heretofore known.

Another object of the invention is to provide a novel and improved machine tool which is particularly suitable for operations requiring maximum accuracy and which permits a multitude of milling, drilling and reaming operations within a predetermined range of operation including practically all machine operations occurring in normal practice. The machine tool according to the invention also facilitates the machining of particular large and bulky work pieces within a predetermined working range by reason of the fact that the table of the machine is freely accessible from three sides, the fourth side of the table being accessible through a cut-out in the frame structure of the machine. The height of the table should be visualized as being adjustable as is conventional. The machine according to the invention further affords several advantages hitherto not available which make the machining operations more convenient, facilitate the exchange of tools, increase the accuracy and save time.

With conventional machine tools of the general kind above referred to, movable parts such as the tool holders, carriages, tables, etc. are set for the desired measurements of the work piece by end measuring gauges or sets of such gauges, the selection, combination and insertion of which into the measuring line is manually effected. The operation of these machine tools requires great diligence and makes high demands on the attentiveness and skill of the operator. As a result, mistakes and failures occur easily and the time required for the various settings is substantial.

Accordingly, it is a further object of the invention to provide means which permit accurately and rapidly to move movable components such as tool holders, carriages, machine tables, etc. from any initial position into a new preselected position without requiring a manual operation for selecting, combining the end measuring gauges and moving the same into the measuring line. All these operational steps are carried out fully automatically by an electrically, mechanically or hydraulically actuated pre-selection as is more fully described hereinafter.

Inasmuch as the selection, combination and insertion of the end measuring gauges is fully automatic, no special demands are made on the diligence and skill of the operator who services a machine tool equipped according to the invention. Semi-skilled operators are fully capable of operating the machine.

The aforesaid objects, features and advantages of the invention and the objects, features and advantages pointed out hereinafter, result in very important advantages of a machine tool according to the invention in comparison with a machine tool of the coordinate system type as heretofore known.

In the accompanying drawings a now preferred embodiment of the invention is shown by way of illustration and not by way of limitation.

In the drawing:

Fig. 2 is a diagrammatic, partly sectional view of the means for selecting and combining the end measuring gauges and inserting the same into the measuring line, and of the means for producing the pressure fluid used for operating the machine and for controlling the flow of the pressure fluid.

Fig. 3 is a cross-sectional view of the aforesaid means for selecting, combining and positioning the end measuring gauges, sometimes hereinafter referred to as the gauge drum.

Figs. 5 and 6 are enlarged developments of a partly developed end measuring gauge carrier in different operational positions thereof.

Fig. 7 is a sectional view of a pre-selecting device.

Fig. 7a is a front view of Fig. 7.

Fig. 8 is a diagrammatic view, partly in section, of a pre-selecting means according to the invention.

The electric circuit systems of the machine are shown only to the extent necessary for the understanding of the invention.

Figure 1:
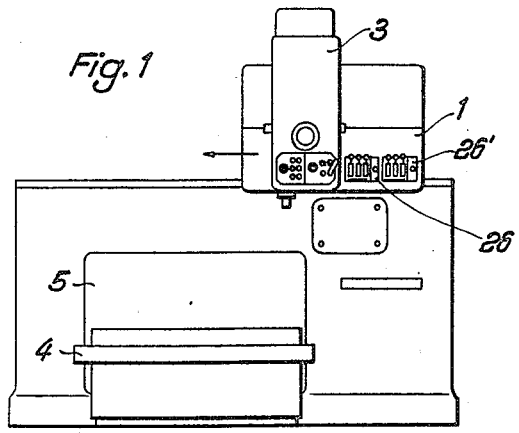
Fig. 1 is an elevational front view of a machine tool according to the invention.
Figure 1A:
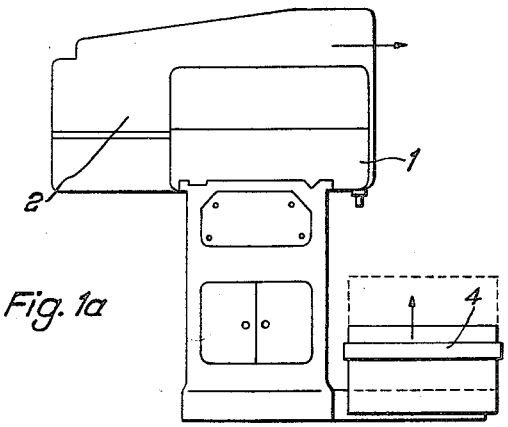
Fig. 1a is a side view of Fig. 1.

Referring now to the figures in detail, Figs. 1 and 1a show a coordinate system type machine tool according to the invention for carrying out drilling, reaming, milling and related operations. The machine as illustrated, comprises carriages 1 and 2, slidable relatively to each other at right angles a spindle box 3 and a machine table 4. The tracks for the carriages cross each other at right angles. The frame of the machine is provided with a cut-out 5 situated adjacent to one side of table 4.

The carriage 1 shown in Fig. 2 is slidable on a bed 6. This bed also supports a drum 7 within which are disposed end measuring gauge carriers or supports 9, 10 and 11 rotatably mounted on a common shaft 8. Each of the carriers 9, 10 and 11 permits to bring one of the end measuring gauges supported by it into the measuring line of the machine. The measuring line is the connecting line between a stationary stop 12 on bed 6 and a movable stop 13 on carriage 1. By way of example, only three gauge carriers are shown in Fig. 2. These carriers support end measuring gauges representing the respective base units of a measuring system for instance, if the metric system is used, the base units of mm., cm. and dm. Obviously, any desired number of gauge carriers may be provided to have available measuring units fitting as closely as desired or necessary. Carriage 1 may be moved by any suitable means for instance, by pressure fluid. The pressure fluid is produced by a pump 14 and directed through a relief pressure valve 15 and a control valve 16 including a system of control slides 17 operable by an electromagnet 18. This magnet is a push-pull magnet and can hence move control slides 17 into either one of two positions, in addition to the central rest position of the slides which is provided by spring force. The hydraulic system diagrammatically shown in Fig. 2 may be of conventional design and is preferably mounted on carriage 1 to simplify the installation of the piping system.

Gauge carriers 9, 10 and 11 are rotated by shaft 8 which in turn is driven by an electromotor 20 through a rotary gearing 21. The gauge carriers and shaft 8 are frictionally coupled. This coupling is amplified for instance, by means of spring loaded friction elements 22 fitted in shaft 8 as best shown in Fig. 3. The rotation of carriers 9, 10 and 11 into the desired positions is controlled by the energization of magnets in rows 23, 24 and 25 of setting magnets. Each gauge carrier is surrounded in circular arrangement by as many magnets as it supports end measuring gauges. Hence, the decimal system which is shown in Fig. 3 requires ten magnets representing the units 0 to IX. The magnets are connected to corresponding switch contacts of the selecting device 26 according to Figs. 7 and 7a.

The selecting device for setting the desired combination of the end measuring gauges comprises a casing housing as many setting discs rotatable on a shaft as there are gauge carriers. Each setting disc is associated with one of the gauge carriers. As mentioned before, Fig. 2 shows three gauge carriers, to wit, carriers 9, 10 and 11 which are associated with the setting discs 27, 28 and 29 of Figs. 7 and 7a.

The setting discs mount contact segments 30 which through sliding contacts close energizing circuits of the magnets selected from the magnets of rows 23, 24 and 25. Setting disc 27 (Fig. 2) associated with gauge carrier 11 further supports a contact segment 31. To be able to house contacts 0 to IX and 0' to IX' in a selecting device 26 of small size, contact segments 30 and 31 and the contacts 0 to IX and 0' to IX' are mounted in two radially staggered circles as can best be seen in Fig. 8. Circle 32 includes contacts 0 to V and 0' to V' and circle 33 contacts VI to IX and VI' to IX'. In case more contacts are required corresponding to the number of setting magnets, such additional contacts are distributed between circles 32 and 33.

When contact finger 30' coacting with contact circle 32 slides over contacts 0 to V, contact finger 30" coacting with contact circle 33 is not in its operational position and vice versa. Both contact fingers slide over a potential carrying contact strip 34. Hence, the control circuit for energizing the pre-selected magnet is closed through the respective contact (0 to IX), the respective contact finger and contact strip 34. The contact segment 31' effects through a contact strip 35 a function which will be described hereinafter. Setting discs 28 and 29 (Figs. 7 and 7a) do not have contacts 0' to IX' (in the lower segment of Fig. 8). Only contacts 0 to IX (in the upper segment of Fig. 8) are provided in two radially staggered circles in the upper part of the discs.

Contact segments 31 and 31' serve to deenergize the contact part of a contact strip 36 (Fig. 2) positioned below the selected unit value say unit 5. The purpose of this arrangement is as follows:

It would be possible always to provide a return run of carriage 1 into its outermost position to assure an unimpeded rotation of gauge carrier 11 supporting the long end measuring gauges. However, if an end measuring gauge on carrier 11 is pre-selected which is smaller than that previously inserted in the measuring line, there is no need to let carriage 1 run back into its outermost position as there is nothing to prevent rotation of the gauge carrier corresponding to the pre-selected end measuring gauge. To avoid a return of carriage 1 into its outermost position under such conditions, the contact strip 36 is provided on bed 6. This strip forms the contact elements 0' to IX' which are insulated one from the other and the spacing of which corresponds to the differences in the length of the end measuring gauges on gauge carrier 11. A slider contact 37 slides over contact strip 36 when carriage 1 is displaced. Slider contact 37 is mounted on carriage 1, insulated therefrom and connects the respective contact elements with a collecting contact strip or bus bar 38. The contact elements 0' to IX' are connected with the corresponding slider contacts of setting disc 27 and the collecting strip or bus bar 38 is connected with the terminal of a switch contact 39. This switch is a safety switch which permits a flow of current and hence the initiation of the next step only when the gauges in the measuring line are in the rest position, that is, when the movable stop 13 is withdrawn and the gauges are returned into the rest position by means of springs 51. In the operational position when the gauge carriers are bunched between the stops 12 and 13, the carrier lifts the conical tip of switch contact 35 thereby opening the contact.

When stop 13 is withdrawn and the gauges are moved into the rest position by springs 51, the ends of the gauges in the direction toward stop 12 are in each gauge carrier in one plane whereas the ends of the gauges toward stop 13 are disposed step-wise in a circle corresponding to the differences in length of the gauges in the respective gauge carrier. Hence the gauge carrier can be freely turned when the gauges are in the rest position. In order to permit a free turning of the gauge carrier 11 which houses the longest gauges, it would be necessary to withdraw stop 13 beyond the longest gauge. Such withdrawal is time consuming and in order to eliminate the same a contact strip 36 having a row of contacts is provided as already mentioned. The contacts on strip 36 are disposed according to the difference in length of the gauges in gauge carrier 11. If, for instance, the gauge carrier supports, according to metric system, ten gauges having a length of 10, 20, 30 etc. to 100 cm., the contacts on strip 36 are spaced by 10 cm. each. In the event the gauge V on setting disc 27 is selected in accordance with the example, segment 31 will de-energize contacts 0 to IV on strip 36 and the remaining contacts are energized. An energizing circuit for initiating the next step is then closed after withdrawal of the carriage through setting disc 27, strip 36, slider contact 37 and switch 39 when slider contact 37 which, as already mentioned, is connected to carriage 1, engages the first one of the contacts under potential during the withdrawal movement of the carriage. As a result the next operation is initiated as soon as stop 13 is withdrawn through a distance corresponding to the preselected gauge and the carriage need not be retracted through the entire distance. The closing of the circuit through slider contact 37 actuates, as will be described, a switch 52 (Fig. 3) which stops the withdrawal motion of the carriage and starts motor 20 accordingly.

The rotation of the pre-selected end measuring gauges into the measuring line by means of the gauge carriers and the function of the respective associated setting magnets 0 to IX (Fig. 3) in the magnet rows 23, 24 and 25 (Fig. 2) is described for the gauge carrier 9 only as the operation of all the gauge carriers is the same. After gauge carrier 9 is rotated into its zero position, motor 20 is reversed which will be more fully described hereinafter and rotates the gauge carrier in opposite direction until a nose 40 (Figs. 2, 5 and 6) extending from a ring 41 on the carrier abuts against a movable protruding stop or limit dog 42 on the pre-selected magnet whereby carrier 9 is arrested. When nose 40 during the return rotation of the gauge carriers into the zero position engages limit dog 42 which is already in position, it presses the dog which for the purpose is laterally movable against spring action, sideways by means of its slanted surface on the nose (Fig. 5), so that the gauge carrier can continue its rotation into the zero position without impediment. Ring 41 is rotatable on the gauge carrier so that it can perform a short rotational movement (Figs. 5 and 6). By means of a spring 43 fitted in a recess 44 the ring is retained in the position of Fig. 5. The grooves 45 and 46 corresponding in number to the number of gauges in the gauge carrier are provided in ring 41 and the gauge carrier in a circular arrangement such that they cannot be in registry in the position of the ring according to Fig. 5, but that the grooves 45 and 46 are in registry when the ring is turned into abutment with the dog against the action of spring 43. The purpose of the grooves to lock the gauges in the preselected position will be still further described hereinafter. As described, limit dog 42 engages nose 40 and arrests ring 41 when rotated into its operational position. The gauge carrier continues its rotation below and independent of ring 41 thereby loading spring 43 until a stop 47 fitted in a cut-out 48 of ring 41 and secured to the gauge carrier abuts against the respective edge of cut-out 48. Grooves 45 and 46 are then in registry (Fig. 6). As a result, a tooth 49 on a spring loaded bar 50 (Figs. 2 and 3) enters grooves 45 and 46 and arrests gauge carrier 9. However, one of the gauge carriers can only be arrested when all the other gauge carriers are simultaneously arrested as teeth 49' and 49" (Fig. 2) of gauge carriers 10 and 11 corresponding to tooth 49 of gauge carrier 9 are mounted on bar 50 at the same level and fixedly interconnected where said teeth can engage grooves 45 and 46 only in all the gauge carriers simultaneously. The purpose of this arrangement is that the subsequently described operation controlled by switch 53 (Fig. 3) which is actuated by engagement of all the teeth of bar 50 with the respective grooves, can be initiated only when and after all the gauge carriers have rotated the respective selected end measuring gauge into the measuring line.

The operation of the device as hereinbefore described results in the completion of the following four operations:

(1) Pre-selection of a new position and return run of the carriage.

(2) Return rotation of all the gauge carriers into the zero position.

(3) Rotation of the gauge carriers from the zero position into positions corresponding to the preselected magnitudes.

(4) Forward or feed run of the carriage corresponding to the selected positions of the gauge carriers, new position.

The electric control means for initiating and completing the aforementioned operations may comprise a conventional contactor equipment or electronic control means.

Figure 9:
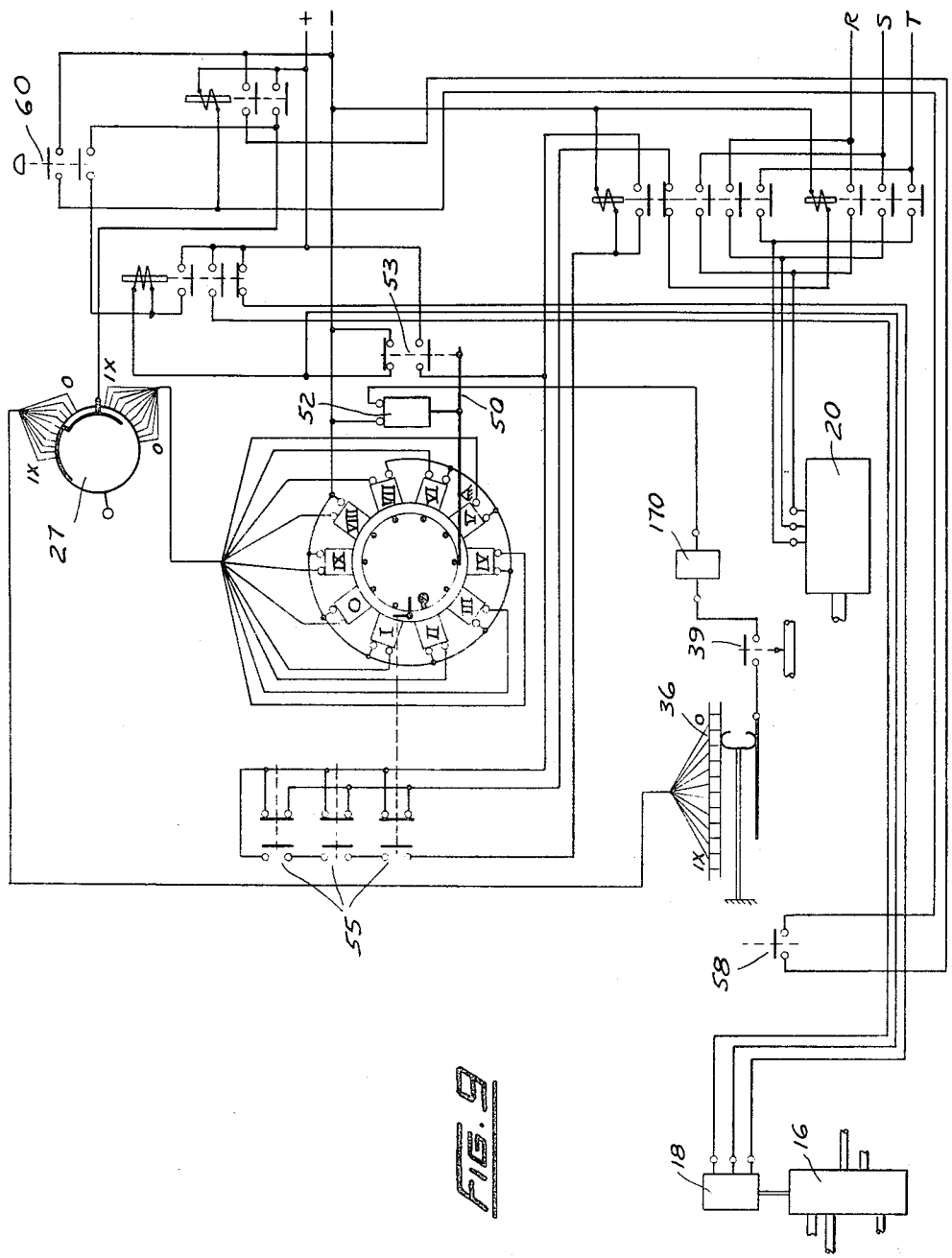
Fig. 9 is a circuit diagram of the machine.

The automatic cycle of the aforementioned operations is initiated by a push button switch 60 (Figs. 7a and 9) which, over circuit systems well known for the purpose, actuates switch elements for magnet 18 and the preselected magnets in magnet rows 23, 24 and 25 (Fig. 2). Magnet 18 sets by means of a relay servo-piston 17 for the return run of the carriage and the limit dogs 42 of pre-selected magnets in rows 23, 24 and 25 move inwardly into their operative positions. Carriage 1 now returns whereby its stop 13 clears the last end measuring gauge in the measuring line. The end measuring gauges are returned by springs 51 into the rest position. As a result, switch contact 39 is closed. Slider contact 37 slides along contact strip 36 until it reaches the first contact element of contact strip 36 which is energized through contact segment, that is, which is pre-selected.

A control circuit is now closed and magnet 52 (Figs. 3 and 9) is energized for a short period of time through a time relay 170 whereby the teeth 49 and 49" of bar 50 release gauge carriers 9 to 1. When the teeth of bar 50 become disengaged from recesses or grooves 45—46, the upper contact of switch 53 is opened and the lower contact is closed. Since after withdrawal of bar 50 springs 43 turn rings 41 into the rotational position in which the recesses or grooves 45—46 are not in registry, bar 50 cannot engage recesses 45 and 46 upon termination of the aforesaid energization pulse but rests yieldingly upon the gauge carriers whereby switch 53 remains in the position in which it was when the teeth of bar 50 became disengaged. The upper contact of switch 53 now disconnects magnet 18 whereby the control sliders are set for idling by spring force and the pressure fluid flows back into the container through relief valve 15. Carriage 1 now remains at rest.

Figure 4:
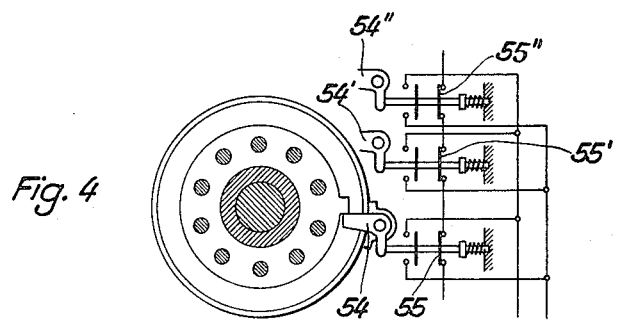
Fig. 4 is another section of the gauge drum and a view of some of the control means associated therewith.

The closing of the lower contact of switch 53 starts motor 20 through a relay arrangement in the direction for turning the gauge carriers into the zero position (Fig. 4 towards the right), the gauge carriers being coupled to shaft 8 by a friction seat. The gauge carriers are retained in the zero position by pawls 54 to 54" (see Fig. 4). Due to the friction coupling between the gauge carriers and shaft 8 and the continued rotation of shaft 8, the gauge carriers exert pressure upon pawls 54 to 54". As a result of such pressure by the gauge carriers each pawl activates a double throw switch 55. Each gauge carrier is associated with one pawl and one double throw switch. The inner contacts of switch 55, which are the rest contacts, are connected in parallel and the outer contacts are connected in series. The inner contacts connected in parallel are opened when the pawls 54 to 54" are actuated by the gauge carriers and disconnect motor 20, but due to the parallel connection only after the last parallel contact has been opened. Such delayed disconnecting of the motor is necessary since the turning angles of the gauge carriers are different depending upon the preceding setting of the gauges so that the gauge carriers do not simultaneously reach the zero position. The outer series connected contacts of switch 55 are closed when the pawls are actuated and restart the motor 20 through the relay arrangement but now in the direction for turning the gauge carriers out of the zero position (Fig. 4 toward the left). Due to the connection of the outer contacts of switch 55 in series, motor 20 is restarted only when all the gauge carriers are in the zero position. The gauge carriers are now turned into the respective newly preselected position whereby noses 40 of the carriers abut against limit dogs 42 of the preselected magnets in rows 23, 24 and 25. As already explained, the limit dogs retain the gauge carriers. As a result, rings 41 are turned relative to the gauge carriers against spring action into a rotational position in which recesses 45 and 46 are in registry. The teeth of bar 50 now engage the recesses in registry and arrest all the gauge carriers in the position into which they have been moved. In the event that one of the limit dogs 42 has not been moved into its operational position for any reason, the respective gauge carrier continues its rotation until its nose engages pawl 54. As a result the teeth of bar 50 cannot enter recesses 45 and 46 and a faulty setting of the gauge cannot occur without immediately becoming visibly evident.

When the teeth of bar 50 engage recesses 45 and 46, the lower contact of switch 53 disconnects motor 20 and the upper contact reconnects magnet 18 which now is connected as a push-magnet by means of a relay arrangement and sets the control slides 17 for forward run of the carriage.

The carriage continues its forward run until its stop member 13 has pressed all the end measuring gauges inserted in the measuring line against the fixed stop 12. Switch contact 39 is opened and hence moved into its next operational position. When movable stop 13 is displaced by engagement with the end measuring gauges it actuates through a lever 56 a reducing valve 57. This valve reduces the volume of pressure fluid fed to piston 19 proportionately to the distance by which stop 13 is displaced to avoid that a collar on the stop member and its abutment on carriage 1 on one hand and the end measuring gauges in the measuring line on the other hand meet with a jarring impact. Before the collar on stop 13 has reached its abutment on the carriage the operation of reducing valve 57 is terminated and a switch 58 is actuated through lever 56. Switch 58 deenergizes the control circuit. By means of an accurately adjusted throttle 59 a pressure constant is built up on the respective side of piston 19 sufficient to bunch the end measuring gauges in the measuring line.

The automatic movement of the carriage into its new position is now completed. For each new setting of a carriage, the preselecting device 26 must be appropriately adjusted if the desired new setting of the carriage differs from the previous setting. The automatic setting of both carriages is effected in the same manner as has been described after actuation of switch 60. The setting for both carriages is made simultaneously so that a separate initiation of the setting operation for each carriage is not necessary. It is merely necessary to preselect the distance of movement for each carriage by means of the respective preselecting device.

While a spindle mounted in the spindle box performs its machining operation such as drilling or reaming operation, the new positions of carriages 1 and 2 are preselected by means of setting discs 27, 28 and 29 of the pre-selecting device 26 and the corresponding setting discs for carriage 2. As long as the tool inserted in the spindle is in working engagement with the work piece, actuation of switch 60 (Figs. 7 and 9) or of the corresponding switch for carriage 2 remains without effect. Only when the spindle occupies a position in which it is certain that the tool is no longer in working contact with the work piece, the aforedescribed subsequent operations can be initiated by operating switch 60 or the corresponding switch for carriage 2.

While the invention has been described in detail with respect to a certain now preferred example and embodiment of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent, is:

1. In a machine tool of the coordinate type having a carriage movable into a preselected position, a device for automatically setting the carriage into the preselected position, said device comprising carriage position selecting means manually settable for a selected position, carriage moving means for automatically withdrawing a carriage and moving it into the selected position, a plurality of gauges of different length grouped in sets, each set including several gauges of selected length, a movable carrier for each set of gauges, power drive means for actuating said gauge carriers, electromagnet means coacting with said selecting means for setting the carriers, and control means for automatically controlling said power drive means in accordance with the setting of the carriers.

2. A machine tool according to claim 1 comprising transmission means between said power drive means and said gauge carriers, said transmission means including a shaft, said gauge carriers being all seated on said shaft with a friction grip, and a springy member increasing the frictional grip between said shaft and said gauge carriers.

3. A machine tool according to claim 1 wherein said electromagnet means are disposed in a circular arrangement about each of said gauge carriers, the number of said electro-magnet means in each circular arrangement corresponding to the number of gauges carried by the respective carrier, and also comprising energizing circuit means connecting said circularly disposed electromagnet means with said selecting means to energize in each circle the electromagnet means corresponding to the setting of the selecting means, said selecting means each including a setting contact, each of said contacts being connected with the respective one of said electromagnet means, limit members movable between an active position and an inactive position, and spring means urging the limit members into the inactive position, said electromagnet means moving the limit members into the active position for limiting movement of the gauge carriers corresponding to the setting of the selecting means and the preselection.

4. A machine tool according to claim 3 and further comprising a ring having recesses rotatably mounted on each of said gauge carriers, each of said gauge carriers having a complementary recess, a stop means for each of said rings to limit rotation thereof to a predetermined rotational distance, a plurality of spring means each holding the respective ring in a rotational position in which said recesses in the ring and carrier are out of registry, a nose on each of said rings engageable with the respective limit member to limit the gauge carriers by means of said limit members in accordance with the positional preselection, said rings being turnable against spring action by engagement of the limit members and the noses into a position in which said recesses are in registry, and retaining means including tooth elements engageable with said recesses to retain said gauge carriers when the selected gauges are in the measuring line and the recesses are in registry.

5. A machine tool according to claim 1 wherein said control means comprise a row of contacts in accordance with the difference in length of the gauges in one set, said contacts when energized activating the movement of the carriage into a predetermined direction, a slider contact fixedly mounted on said carriage and coacting with said contacts, circuit means connecting said contacts and said selecting means in a control circuit for de-energizing said contacts corresponding to the length of the gauges in said set, to stop movement of the carriage withdrawal at a point in accordance with the length of the gauges in said set, said stopping point being determined by said slider contact reaching the first de-energized row contact.

6. A machine tool according to claim 1 wherein said power drive means include a reversible motor and further comprising switch means actuated by the movement of said gauge carriers and controlling said motor, said switch means including switches and pawls for actuating said switches, said pawls being operated by said gauge carriers reaching a predetermined limit position to stop said motor and restart the same in opposite direction, said limit position constituting the zero position of the gauge carriers.

7. A machine tool according to claim 1 wherein said power drive means include a motor and said gauges are disposed in a measuring line and movable therein between a bunched position and a spread apart portion, and further comprising safety switch means controlling an energizing circuit for said motor and controlled by the position of said gauges in the measuring line to prevent closing of said energizing circuit when and while said gauges are bunched in said measuring line.

8. A machine tool according to claim 1 wherein said carriage position selecting means comprises a plurality of contacts and contact segments disposed in several concentric radially spaced circle sectors whereby said contacts and contact segments occupy a minimum space in the selecting means.

References Cited in the file of this patent

UNITED STATES PATENTS

| | | |
|---|---|---|
| 1,936,446 | Burell | Nov. 21, 1933 |
| 2,364,318 | Schauer | Dec. 5, 1944 |
| 2,545,837 | Berthiez | Mar. 20, 1951 |
| 2,557,582 | Turrettini | June 19, 1951 |
| 2,561,346 | De Vlieg et al. | July 24, 1951 |
| 2,580,255 | Summers | Dec. 25, 1951 |
| 2,692,518 | Armitage | Oct. 26, 1954 |